United States Patent [19]

Paradis

[11] Patent Number: 4,658,478
[45] Date of Patent: Apr. 21, 1987

[54] BUNDLING OF OBJECTS

[75] Inventor: Joseph R. Paradis, Holden, Mass.

[73] Assignee: Dennison Manufacturing Company, Framingham, Mass.

[21] Appl. No.: 650,588

[22] Filed: Sep. 14, 1984

Related U.S. Application Data

[63] Continuation of Ser. No. 167,890, Jul. 14, 1980, Pat. No. 4,473,524.

[51] Int. Cl.⁴ .............................................. B65D 63/00
[52] U.S. Cl. ............................. 24/16 PB; 24/17 AP; 24/30.5 P
[58] Field of Search ............. 24/16 PB, 17 AP, 17 R, 24/17 A, 17 B, 30.5 P, 20 TT; 248/74.3; 292/318, 319, 320, 321

[56] References Cited

U.S. PATENT DOCUMENTS

| | | | |
|---|---|---|---|
| 3,605,199 | 9/1971 | Eberhardt | 24/16 PB |
| 3,872,547 | 3/1975 | Caveney et al. | 24/16 PB |
| 3,887,965 | 6/1975 | Schuplin | 24/16 PB |
| 4,001,898 | 1/1977 | Caveney | 24/16 PB |
| 4,003,106 | 1/1977 | Schumacher et al. | 24/16 PB |
| 4,093,288 | 6/1978 | Suzuki | 24/16 PB |
| 4,135,749 | 1/1979 | Caveney | 24/16 PB |
| 4,136,148 | 1/1979 | Joyce | 24/16 PB |
| 4,137,606 | 2/1979 | Wood | 24/16 PB |

FOREIGN PATENT DOCUMENTS

| | | | |
|---|---|---|---|
| 2556411 | 6/1977 | Fed. Rep. of Germany | 24/16 PB |
| 1519233 | 7/1978 | United Kingdom | 24/16 PB |

Primary Examiner—Victor N. Sakran

[57] ABSTRACT

Bundling of objects using a harnessing device with a locking head and a strap with teeth that are controlled by stretching. The locking head contains a pawl or tang that engages the teeth of the strap by wedging. A wedging tooth is desirably on the locking tang as well, and a further tooth to promote locking is desirably included in the locking head. The strap is advantageously molded of stretch reorientable material which is subsequently stretched to control the profile of the teeth which are engaged by the locking tang and head.

11 Claims, 8 Drawing Figures

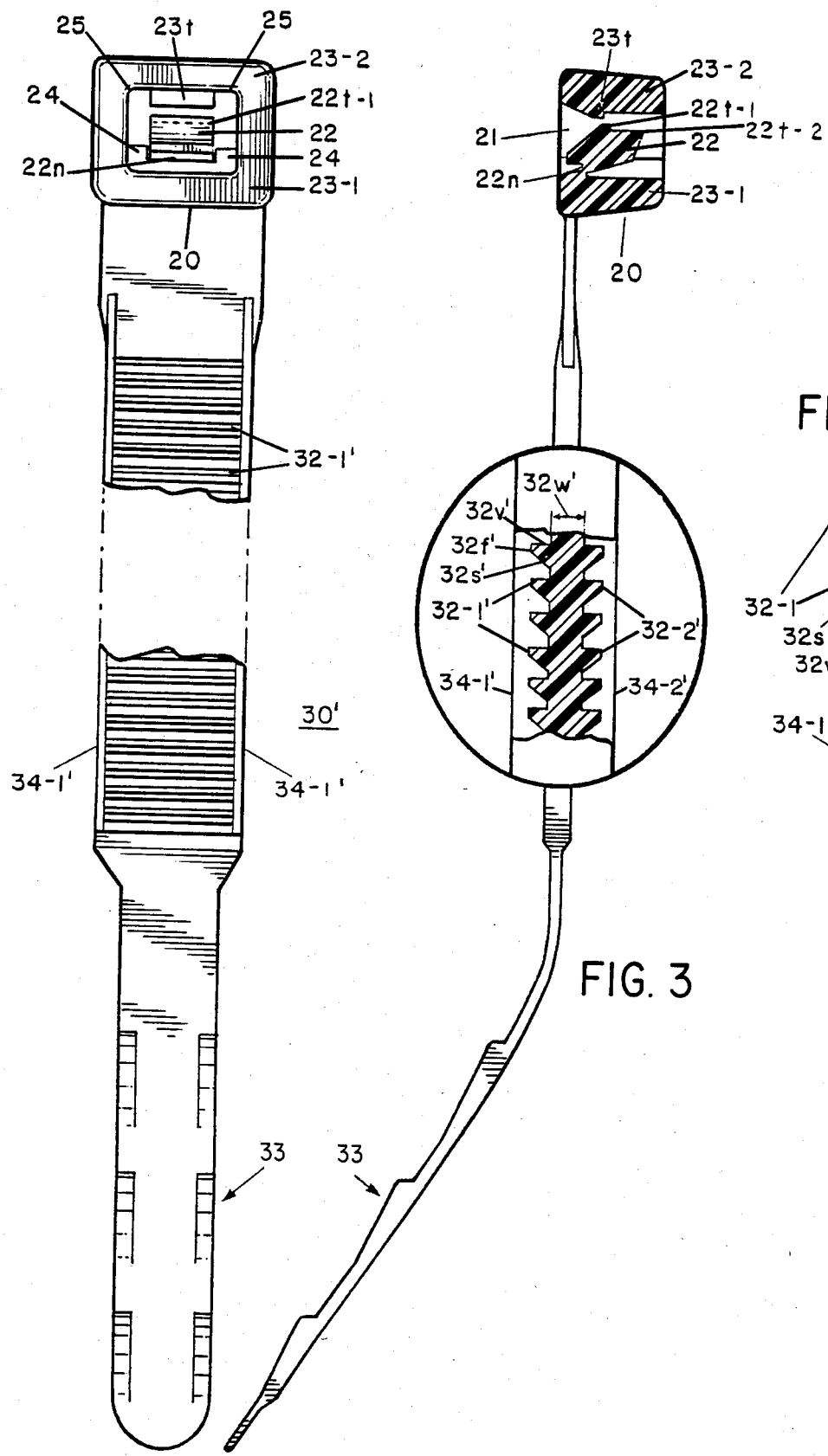
FIG. 2
FIG. 3
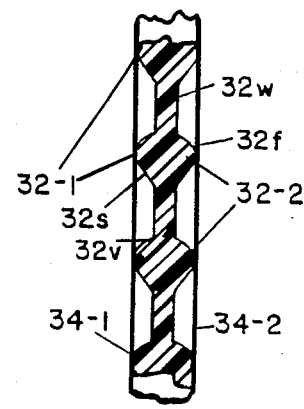
FIG. 4

BUNDLING OF OBJECTS

BACKGROUND OF THE INVENTION

This is a continuation of Ser. No. 167,890, filed 7/14/80, now U.S. Pat. No. 4,473,524.

Harnessing devices are widely used for the bundling of objects. Such devices are typically formed with a serrated strap that is fitted to an apertured head containing an internal pawl or locking tang that engages the serrations of the strap. Other harnessing devices are in the form of an apertured strap fitted to a buckle-like head, with a tongue that enters the apertures of the strap.

Harnessing devices with serrated straps have the disadvantage of being only as secure as their pawls. Where the items that are harnessed are heavy or are subjected to rough handling, the items can become accidentally released, for example, by pawl failure. Attempts have been made to strengthen serrated strap devices, without achieving the desired end result of providing enhanced security against accidental release of harnessed items. Similar objections apply to harnessing devices with buckle-like heads. In these devices, a tongue which enters the strap apertures rests against the head of the buckle near its opening and is deflected by the strap. The tongue is typically a cantilever attachment to the buckle-like head, which is inadequate in most harnessing applications.

In order to avoid and overcome many of the difficulties associated with the foregoing kinds of harnessing devices, ladder straps and associated locking tangs have been developed of the kind disclosed in U.S. Pat. No. 3,766,608, which issued Oct. 23, 1973. The ladder strap device represents a significant improvement over the serrated strap and other harnessing devices. It can accomplish substantially the same functions as a serrated strap device at a considerably lower cost. The ladder strap can be produced with a significant saving in material and can be stretched to reorient its molecular structure and strengthen its constituents without strap distortion, as would occur if an attempt were made to stretch a serrated strap.

Notwithstanding its advantages, however, the ladder strap is not suitable for every bundling application. The precision with which the ladder strap tie can be adjusted is controlled by the spacing between its rungs. Since it is advantageous for the strap of the ladder tie to be stretched in order to reorient its crystalline structure, the stretching often produces a separation of subsequent rungs which reduces the precision with which such a tie can be used in the bundling objects. In addition the ladder tie makes use of a deflectable pawl which extends between adjoining rungs. The locking of the pawl with the strap results in the application of substantially shear pressures to the pawl.

Accordingly, it is an object of the invention to provide for the secure harnessing of items. A related object is to achieve secure harnessing without the need for a complex harness configuration. Other related objects are to achieve cost effective, light weight, minimum material, and precisely adjustable device.

A further object of the invention is to provide a harnessing device which is efficient, accurate and rapid to use. A related object is to provide a suitable structure without an undue increase in bulk. Another related object is to overcome the difficulties associated with harnessing devices. Still another related object is to produce a structure that has sufficient mass for efficient use while being sufficiently light in weight so as not to interfere with harnessing operations.

A further object of the invention is to achieve secure anchoring of the strap in the head.

Still another object of the invention is to achieve precision control over the strap configuration in order to realize precise bundling of objects.

SUMMARY OF THE INVENTION

In accomplishing the foregoing and related objects the invention provides a harnessing device with a locking head and an attached strap. At least one side of the strap desirably includes a set of teeth with a profile that is controlled by stretching. When the strap is unstretched it can be locked in the head by virtue of the profile of the teeth on the strap, or the configuration of a locking pawl in the head. The device is fabricated by molding with an attached strap which can be stretched to control its profile.

In accordance with one aspect of the invention the head contains a locking pawl for wedging the strap in the head. The pawl is desirably deflectable but can also be stationary when appropriately proportioned.

In accordance with another aspect of the invention the pawl includes a tooth that is engageable with the strap. A plurality of such teeth are desirably on the pawl, at least one tooth for setting the strap with respect to the head and at least another tooth for effecting the desired wedging of the strap within the head. The pawl advantageously includes a ramp that extends from a channel entry position of the head to the first tooth on the pawl.

The one tooth for setting the strap also preferably acts as a means for achieving pivoting or rotating of the pawl during strap insertion. The other tooth accomplishing the wedging function is preferably not subjected to any significant load during strap insertion whereby the possibility of damage to the critical wedging tooth is effectively avoided.

In accordance with still another aspect of the invention the pawl is desirably secured to the locking head by a hinged neck. The hinged neck advantageously is at an intermediate position on the lower portion of the pawl to provide a locking ledge with respect to the head for both forward and reverse thrust motions of the strap.

In accordance with yet another aspect of the invention the channel in the locking head for the entry of the strap advantageously includes side ledges that facilitate guidance of the strap in the channel. The locking head also can include, in the upper wall of its channel, at least one tooth for engagement with the strap to enhance the locking effect that is achieved using the locking pawl.

In accordance with a further aspect of the invention the pawl includes at least one tooth with a trailing edge that is at less than a right angle to the principal axis of the channel in the head. The trailing ramp of the pawl is advantageously parallel to the principal axis of the head when the pawl is in its equilibrium rest position.

In accordance with a still further aspect of the invention the harnessing device includes a pawl connected in a channel of a locking head by a hinged neck at an intermediate lower profile position, and a tooth on its upper profile for wedging the strap in the channel. Such a strap does not need to be stretched, but advantageously has teeth with a profile that is controlled by stretching. The hinged neck is desirably near the midposition of the lower portion of the pawl to provide a locking ledge for both forward and reverse thrust motions of the strap. The hinge configuration preferably provides maximum flexibility with a sacrifice of strength, the pawl design and related structure separately providing the necessary strength.

In accordance with still another aspect of the invention the strap contains a double set of teeth, one on each side of the strap, each with profile that can be controlled by stretching. It is desirable for the teeth to be symmetrical with respect to the principal axis of the strap, and for the strap to include side rails at its edges. However, the side rails can be omitted from one or both sides of the strap.

In accordance with an additional aspect of the invention, when one or more side rails are included at the edges of a stretchable strap, they have a higher profile than the teeth prior to stretching. It is desirable for the strap to be stretched so that the side rails become tangential to the peaks of the teeth after stretching.

In accordance with still another aspect of the invention the teeth of the strap have a curved trailing edge which is desirably produced by stretching a trailing edge that is substantially at a right angle with respect to the principal axis of the strap. It is also desirable for the teeth of the strap to have inclined ramp leading edges. Successive ones of the teeth are interconnected by a web which is narrower than the maximum height of the teeth. The connecting web advantageously has a substantially uniform thickness. It is particularly desirable for the web to lie along the central axis of the strap and to be symmetrically positioned.

In accordance with yet another aspect of the invention the harnessing device is fabricated by a molding operation in which teeth are provided on opposite sides of the strap. The molding can also provide for the formation of side rails at one or more edges of the strap, with a higher profile than the associated teeth. The strap can then be subjected to a stretching step to reduce the profile of the rails relative to the teeth. In an advantageous embodiment the strap is stretched until the profile of the side rails is tangential to the peak of at least one tooth.

In accordance with a still further aspect of the invention the strap is molded with teeth having a flat that is parallel to the axis of the strap and is converted to a rounded profile by stretching. The molding step desirably includes provision for molding of the strap with successive teeth connected by a web which is narrower than the maximum height of the teeth. This operation can be followed by the step of stretching the strap to elongate the web interconnecting successive ones of the teeth. When stretching during production is accomplished, strap flexibility is readily achieved during use. Thus, the strap will stretch to a degree when wrapped around a bundle, and when the wrapping force is released, the stretched strap will retract thereby more effectively achieving the locking action characteristic of the design.

The strap is used to encircle items to be bundled and desirably extends at an angle from the locking head with respect to the principal axis of the guide channel in the head. The profile of the teeth on the strap is shaped to reduce the force required for insertion of the strap in the head and to limit the tendency of thrust applied to the head to fracture the pawl.

DESCRIPTION OF THE DRAWINGS

Other aspects of the invention will become apparent after considering several illustrative embodiments taken in conjunction with the drawings in which

FIG. 2 is a plan view of the device of FIG. 1 before the stretching of its strap, in its extended unbundled condition;

FIG. 2A is an enlarged fragmentary plan view of the head portion of the strap;

FIG. 3 is a side sectional view of the bundling device of FIG. 2, including an enlarged fragment showing the unstretched teeth of the strap;

FIG. 4 is a side sectional view of the strap portion of FIG. 3, after stretching, showing the control exercised over the profile by stretching;

DETAILED DESCRIPTION

Figure 1:
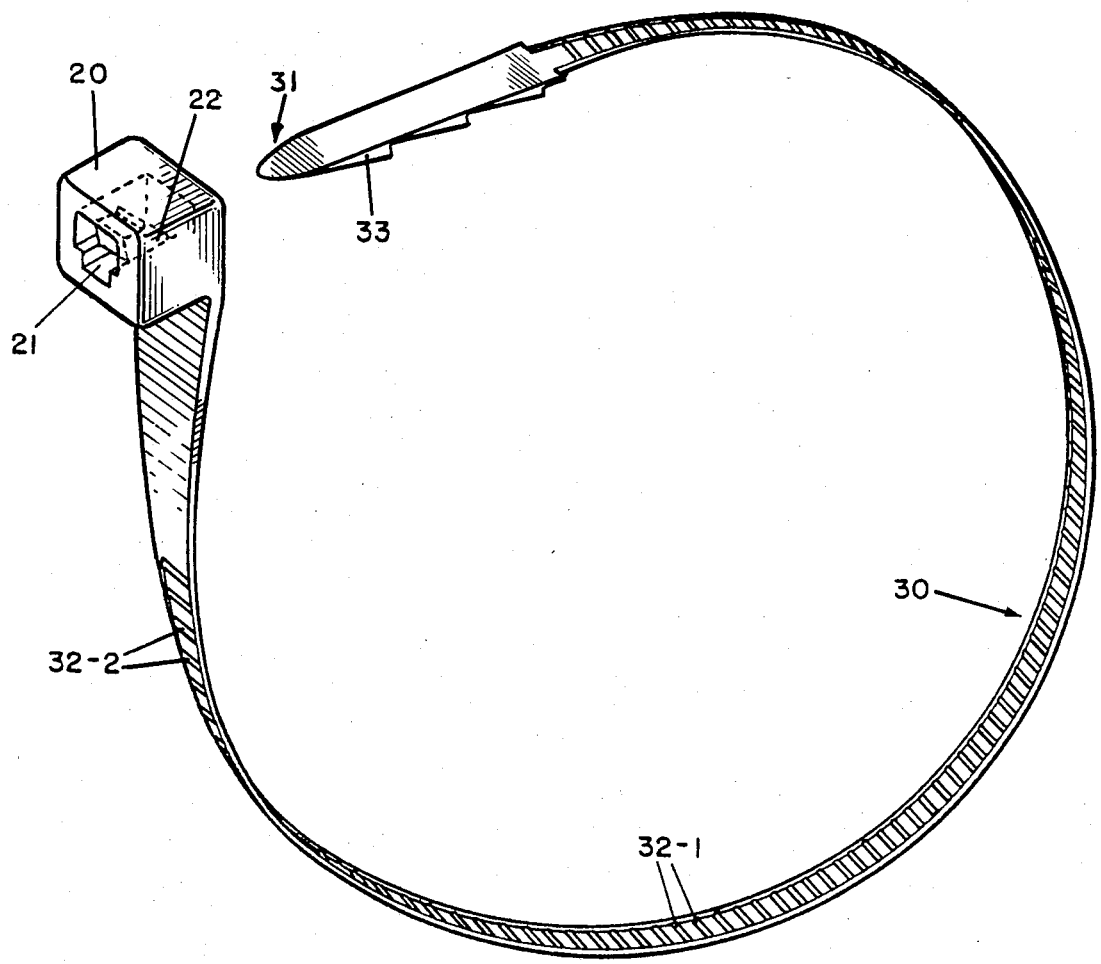
FIG. 1 is a perspective view of a bundling device in accordance with the invention.

As shown in FIG. 1, a harnessing device 10 in accordance with the invention includes a head 20 and an attached strap 30. The strap 30 is in the form of a toothed structure with a set of teeth 32-1 on one side of the strap and a mating set of teeth 32-2 on the opposite side of the strap. The free end 31 of the strap 30 includes a tail portion 33 which is insertable into a channel 21 of the head 20 to bring the strap into engagement with an internal locking tang or pawl 22.

As indicated in FIGS. 2 and 3 the pawl 22 is desirably joined to a lower wall 23-1 of the head 20 by a neck 22n. The neck 22n is connected to the pawl 22 at an intermediate position to reduce any shear tendency by the pawl during the application of either a forward or reverse thrust to it. This is in part by virtue of the bulges of the pawl 22 extending beyond either side of the neck 22n. Referring in particular to FIG. 2A, it will be noted that the neck 22n includes side surfaces positioned adjacent side wall shoulders 24. In accordance with the preferred form of the invention, these side surfaces are disconnected from the shoulders to provide maximum flexibility for the pawl. While this would appear to sacrifice pawl strength in that there is a reduced cross section of material connecting the pawl to the head this is not in fact the case. The problem of pawl strength is not of serious concern during the insertion of the strap into the head, and in fact applicant's preferred design helps to reduce the amount of minimum force required for insertion. At the same time upon strap release the support afforded by the wedging tooth and the locking tooth provides a sufficiently strong coupling of the strap to the head that there is little danger of pawl failure. Consequently the deliberate disconnection of the pawl from the side wall shoulders 24 at positions 26 enhances pawl flexibility without any significant reduction in pawl strength. In addition the upper profile of the pawl 22 includes a plurality of teeth 22t-1 and 22t-2, which serve respective "setting" and "wedging" functions. The setting tooth 22t-1 is trapezoidal. It has a leading point formed by the intersection of a ramp surface with a flat that is parallel to the axis of insertion of the strap, and a trailing point formed by the intersection of the flat with a vertical trailing edge. The tooth 22t-1 serves to properly position the strap, after insertion, with respect to the upper wall 23-2 of the head 20. The wedging tooth 22t-2 lies at the trailing edge of the pawl 20. It has a tip formed by a trailing flat of the pawl, below the flat of the setting tooth 22t-1, and a trailing edge which is at an angle less than 90° when the pawl is in equilibrium. It is the wedging tooth 22t-2 which provides the wedging function by which the strap 30 is properly located in position in the head 20.

The opposite wall 23-2 of the head 20 includes a locking tooth 23t. This has a trapezoidal profile similar to that of the setting tooth 22t-1 of the pawl 20, except that it is stationary. Accordingly the locking tooth 23t has a leading point formed by the intersection of a downwardly inclined ramp and a flat, and a trailing point formed by the intersection of the flat with a trailing edge that is perpendicular to the axis of insertion of the strap 31.

In use, the harnessing device 10 is looped about objects to be bundled, with the strap 30 assuming initially the configuration shown in FIG. 1. To complete the bundling operation the tail portion 33 is inserted into the channel 21 of the head 20, as explained in detail below with reference to FIGS. 5A through 5C.

In order to promote the wedging of the teeth of the strap within the head, as well as the engagement of the strap with the teeth 22t-1, 22t-2 and 23t, the teeth 32-1 and 32-2 are of a controlled configuration which is determined by the way in which the strap is stretched during manufacture.

The individual teeth of the unstretched strap of FIG. 3 have a prescribed profile with respect to the principal axis of the strap. There is a trailing vertical edge 32v', a flattened upper edge 32f and a sloping leading edge 32s'. The angle of slope of the edge 32s' is desirably about 45° with respect to the principal axis of the strap 30. The flattened portion 32f of the tooth is about ⅓ of the overall tooth depth. The height of the vertical portion 32v' is greater than approximately ½ of the width of the web 32w'. The side rails 34-1 and 34-2 extend beyond the respective sets of teeth 32-1' and 32-2' to provide a margin which is approximately the same as the height of the unstretched trailing edge 32v' with respect to the surface of the web 32-w'.

The strap 30' molded as shown in FIG. 3 can be used with the locking head 20 if suitably modified. However, the proportions shown for the locking head 20 in FIGS. 2 and 3 are intended for accommodating the strap 30' after stretching. The result of stretching is indicated in FIG. 4, providing a reduction of the profile of the side rails 34-1 and 34-2 to be approximately tangential with the peaks of the stretched teeth 32-1 and 32-2. The trailing edge 32v' of FIG. 3 becomes rounded trailing edge 32v in FIG. 4. A similar rounding effect takes place to convert the flat surface 32f of FIG. 3 into the rounded tangential surface 32f of FIG. 4. The sloping surface 32s' of FIG. 3 is merely extended by the stretching and becomes the extended sloping surface 32s of FIG. 4. The web 32w' is reduced in width forming the stretched web 32w which extends between adjoining teeth.

The strap teeth configuration is preferably not complementary in either spacing or shape when compared with the teeth 22t of the pawl. The strap engaging edges of the respective teeth 22t-1 and 22t-2 are more closely spaced than corresponding points of adjacent strap teeth 32f. Moreover, the pawl teeth edges are relatively sharp when compared with the rounded teeth of the strap. In practice, the spacing of the pawl teeth comprises from 50 to 90 percent of the spacing of the strap teeth, preferably between 60 to 80 percent. It will be appreciated that the relative spacing can be varied depending upon the degree of stretching imparted to the strap.

Figure 5A:
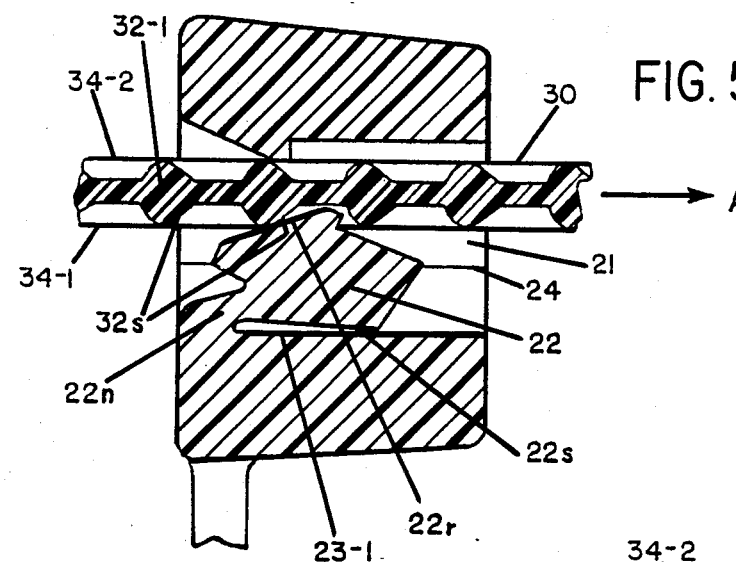
FIG. 5A is a side elevational view of the head portion of the bundling device showing its strap in the course of being inserted.
Figure 5B:
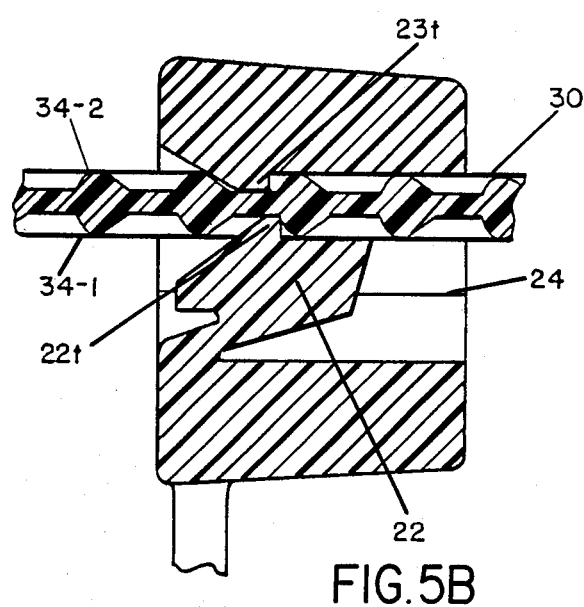
FIG. 5B is a side sectional view of the head portion of FIG. 5A showing the strap in its equilibrium condition after insertion.
Figure 5C:
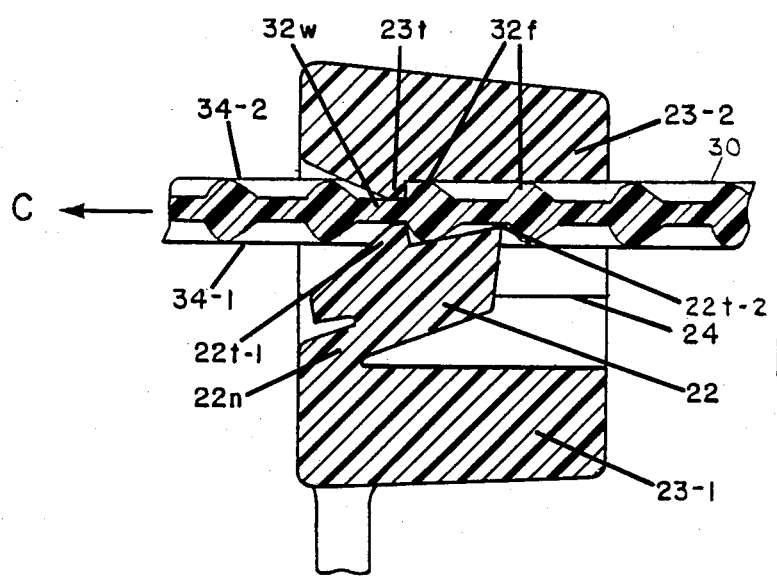
FIG. 5C is a side sectional view of the head portion of FIG. 5B showing the interrelation between the teeth of the strap and the locking pawl when reverse thrust is applied to the strap.

The consequences of inserting the stretched strap 30 into the locking head 20 are illustrated in FIGS. 5A through 5C. FIG. 5A shows the strap 30 in the course of being fed through the channel 21 in the direction indicated by the arrow A. The engagement of the sloping surface 32s of the teeth 32-1 with ramp surface 22r of the locking tang 22 causes the locking tang to pivot about its neck portion 22n so that the lower surface 22s of the pawl 22 approaches the surface of the wall 23-1. During insertion of the strap 30 the side rails 34-1 tend to be guided by the shoulders 24 of the head 20 as shown in FIG. 5A and in FIG. 2.

During strap insertion, the setting tooth 22t-1 also serves as the means for achieving pivoting or rotating of the pawl 22. As successive strap teeth 32 engage the pawl, the pivoting movement substantially prevents contact of a preceding strap tooth 32 with wedging tooth 22t-1. Accordingly, there are little or no forces applied to the wedging tooth during strap insertion whereby damage to the wedging tooth is avoided. The tooth is, therefore, exclusively used for the locking function.

When the forward motion of the strap into the locking head is terminated the locking tang 20 returns to its equilibrium position as shown in FIG. 5B. In this position the strap 30 has its outer side rails 34-2 pushed towards upper ledges 25 that straddle the internal tooth 23t in the head 20 as shown in FIG. 2. As further indicated in FIG. 5 the setting tooth 22t-1 of the pawl 22 is positioned between two of the teeth 32, while the locking tooth 23t in the head 20 is similarly positioned between corresponding upper teeth 32-2.

Reverse thrust is applied in the direction C as shown in FIG. 5C, as when the strap 30 inserted into the head 20 is released under load. The deflectable pawl 22 pivots in a counterclockwise direction about the neck 22n and the tooth 22t-2 tends to wedge into the web 32w, producing a corresponding wedging action of the locking tooth 23t in the upper portion of the web 32w. In the usual wedging situation, the pawl 20 has a position similar to that indicated in FIG. 5C, with the trailing edge surface 27 of the pawl (forming the trailing surface of the wedging tooth 22t-2) occupying a position that is substantially perpendicular to the axis of insertion of the strap. The setting tooth 22t-1 also tends to be in alignment with the locking tooth 23t. If there is an appreciable increase in reverse thrust (due to an unusually heavy load) the pawl 20 continues its counterclockwise rotation and the wedging action of the tooth 22t-2 is accentuated. The gap 29 between the front of the pawl and the neck 22n tends to be reduced until it is eliminated.

The setting, wedging and locking functions of the teeth 22t-1 and 22t-2 on the pawl 22 and the tooth 23t in the head 20 are clearly evident from FIGS. 5A-5C, particularly 5C. As seen in FIG. 5C the setting tooth 22t-1 serves for the proper positioning of the strap 30 against the locking tooth 23t in the upper wall 23-2 of the head 20. In addition the wedging tooth 22*t*-2 assures the proper locking action of the strap against the head by biting into the web 32*w* and acts with the flat of the pawl to force an upper tooth 32*f* against the locking tooth 23*t*. The tooth 22*t*-2 bites into a wedge portion 32*w* as opposed to engaging a tooth 32*f* because of the non-complementary tooth spacing previously discussed.

The setting, wedging and locking actions are particularly important in the case of a stretched strap. The stretching operation controls the profile of the teeth 32-1 and 32-2 and forms them to facilitate proper positioning of the strap in the head. In addition the stretching operation lengthens the web 32*w* and increases its tensile strength so that the wedging tooth 22*t*-2 promotes the locking of the strap in the head by contact of the web as shown in FIG. 5C. Finally, the stretching substantially reduces the thickness of the web so that a preferred configuration is achieved wherein the web has a substantially uniform thickness, extends substantially uniformly between adjacent teeth, and is narrower than the maximum height of a tooth.

It is to be noted that the locking action of the tooth 23*t* in the upper wall of the head 20, and of the teeth 22*t*-1 and 22*t*-2 in the upper surface of the pawl 22, are merely advantageous and not necessary for suitable operation of the harnessing device. With any or all of the teeth 23*t*, 22*t*-1 and 22*t*-2 eliminated the pawl 22 still produces a wedging action by virtue of its forcing the upper surfaces of the teeth 32-2 against the wall surface 23-2. There is a similar wedging against the upper face of the pawl 22.

It is to be noted further that the head 20 and the pawl 22 are merely exemplary and that a harnessing device with an unstretched strap having the profile shown in FIG. 3 or a stretched strap having a profile like that of FIG. 4 can be used with a wide variety of other locking heads, including locking heads in which the pawl is stationary. Such a pawl can be temporarily deformed by pressure without requiring actual pivotting of the pawl about a neck.

In providing the harnessing device of FIG. 1, the unstretched device of FIG. 2 is molded of stretch orientable material, such as nylon, polypropylene, polyurethane and the like. The teeth, strap and side rails are proportioned to permit subsequent stretching, which takes place by applying stretching stress between the tip 33 and the head 20 along the major axis of the strap. The results are the controlled tooth profile strap of FIGS. 1 and 4.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. A harnessing device comprising
   a locking head,
   a strap attached to said head and containing teeth on at least one side, and
   a deflectable locking pawl in said head for wedging said strap therein,
   said pawl containing at least a setting tooth which engages said strap during its insertion into said head and a wedging tooth which is out of contact with said strap during insertion into said head, wherein said locking head included an entry channel having at least one engagement tooth therein for said strap directly opposite the setting tooth; a ramp that extends from the entry thereof to said engagement tooth; said engagement tooth having a trialing edge which is substantially at a right angle with respect to the channel of said locking head; and a flat which is parallel to the axis of insertion of said strap into said head for engagement with the web of said strap.

2. Apparatus as defined in claim 1 wherein the surfaces of the setting and wedging teeth lie in at least five different intersecting planes when said pawl is in its equilibrium position.

3. Apparatus as defined in claim 1 wherein said strap includes side rails at the edges of said strap which initially have a higher profile than said teeth and are permanently stretched to have a profile that is tangential to the peaks of said teeth.

4. Apparatus as defined in claim 1 wherein each of said strap teeth has an inclined ramp leading edge, a rounded apex, and a curved trailing edge.

5. Apparatus as defined in claim 1 wherein successive ones of said teeth are interconnected by a web which is at an axis of symmetry of said strap and narrower than the maximum height of said teeth.

6. Apparatus as defined in claim 1 wherein said setting tooth has a ramp edge extending to a flat apex and that setting tooth and wedging have a different pitch than the strap teeth.

7. Apparatus as defined in claim 1 wherein the wedging tooth is at the trailing edge of said pawl and contacts said strap simultaneously with said setting tooth during reverse thrust.

8. Apparatus as defined in claim 7 wherein said wedging tooth has a leading edge in equilibrium position, that is parallel to the axis of insertion of said strap, and has a trailing edge, in equilibrium, that is at an angle less than 90° with respect to the axis of insertion of said strap.

9. A harnessing device comprising
   a locking head having a channel therethrough,
   a pawl positioned in said channel,
   a strap attached to said head,
   said pawl being connected in said channel to said locking head by an angularly elevated hinged neck at an intermediate position of said pawl which further includes a rectilinear tooth on its upper profile for wedging a curvilinear tooth said strap in said channel, said deflectable pawl contains at least a setting tooth and wedging tooth with different profiles, wherein either of the setting and wedging teeth lie in a flat plane when said pawl is in its equilibrium position; the wedging tooth is at the trailing edge of said pawl and has a leading edge, in equilibrium position, and that is parallel to the axis of insertion of said strap and a trailing edge, in equilibrium position, that is at an angle less than 90° with respect to the axis of insertion of said strap.

10. Apparatus as defined in claim 9 wherein said pawl is deflectable without collapse of said neck.

11. Apparatus as defined in claim 9 wherein said head includes a ramp that extends from the entry of said locking head to a tooth thereof and side ledges below the pawl centroid for the guidance of said strap.

* * * * *